United States Patent [19]

Lunde

[11] Patent Number: 5,653,162
[45] Date of Patent: Aug. 5, 1997

[54] SMOKER-GRILL

[76] Inventor: Howard Leroy Lunde, P.O. Drawer 300, Oconto, Wis. 54153-0300

[21] Appl. No.: 406,492

[22] Filed: Mar. 20, 1995

[51] Int. Cl.⁶ .................................................. A47J 37/07
[52] U.S. Cl. ........................ 99/450; 99/482; 126/9 R
[58] Field of Search ........................... 99/481, 482, 446, 99/449, 410, 467, 450; 126/38, 9 R, 9 B, 51, 43, 26

[56] References Cited

U.S. PATENT DOCUMENTS

| | | | |
|---|---|---|---|
| 26,595 | 12/1859 | Danner | 126/38 |
| 572,908 | 12/1896 | Peters | 126/38 |
| 1,485,292 | 2/1924 | Popper | 126/38 |
| 1,544,663 | 7/1925 | Lichtenberg | 126/38 |
| 2,334,847 | 11/1943 | Spiers | 126/9 R |
| 2,860,624 | 11/1958 | Eddy | 126/9 B |
| 2,873,453 | 2/1959 | Kirschner | 126/9 R |
| 3,913,557 | 10/1975 | Ewanika et al. | 126/38 |
| 3,978,782 | 9/1976 | Werling | 99/446 |
| 4,175,485 | 11/1979 | Wojahn | 99/482 |
| 4,706,817 | 11/1987 | Greathouse | 126/9 B |
| 4,793,321 | 12/1988 | Rafford et al. | 126/43 |
| 5,313,928 | 5/1994 | Rodgers et al. | 126/38 |
| 5,400,703 | 3/1995 | Ashcom et al. | 99/446 |
| 5,413,087 | 5/1995 | Jean | 126/38 |

FOREIGN PATENT DOCUMENTS 109144  5/1984  European Pat. Off. ................ 126/38

*Primary Examiner*—David Scherbel
*Assistant Examiner*—Tony G. Soohoo

[57] ABSTRACT

The smoker grill has five major parts: 1) a cover, 2) a wire rack, 3) a base unit with four side walls and a divider, 4) a fire pot, and 5) a stand. Air inlet holes are located along the base of the sidewalls. A stainless steel divider is located above the air holes in the base unit. The divider separates the enclosure into an upper chamber where the food is smoked or grilled, and a lower chamber. The divider is sloped downward to a hole in the center that allows grease from the food to drip into the fire pot in the lower the chamber. The fuel in the fire pot is denatured alcohol. When smoking a food product, a wood product is placed on the divider and food is placed on the wire rack above the wood product. When using the device as a grill, a wood product wood product is not used. A cover is provided over the unit to enclose the upper chamber. The fire from the fire pot in the lower chamber heats the stainless steel divider which smokes the wood product or grill the food product in the upper chamber. The smoke in the upper chamber is forced down four rectangular holes in the corners of the divider. The smoke in the lower chamber may be ignited from the burning alcohol to produce a secondary burning which gives an even heat over the whole unit.

4 Claims, 4 Drawing Sheets

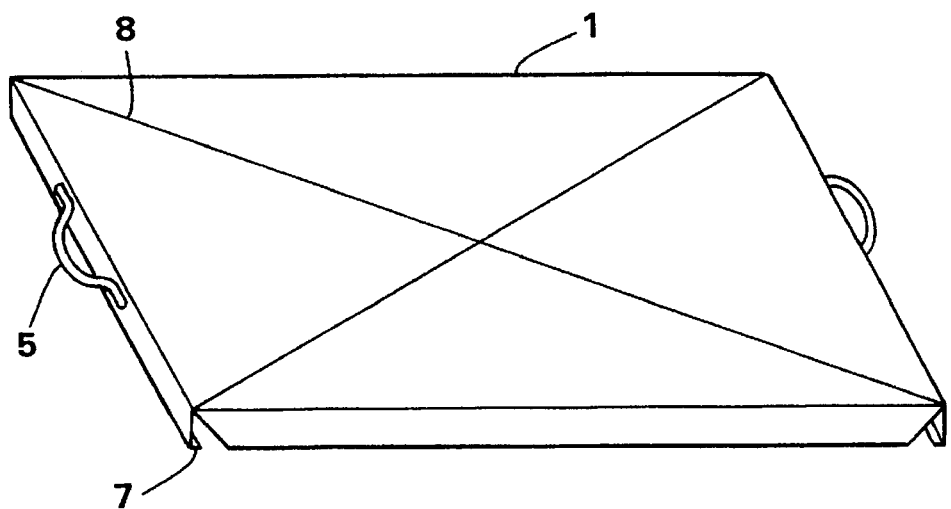
FIG. 7
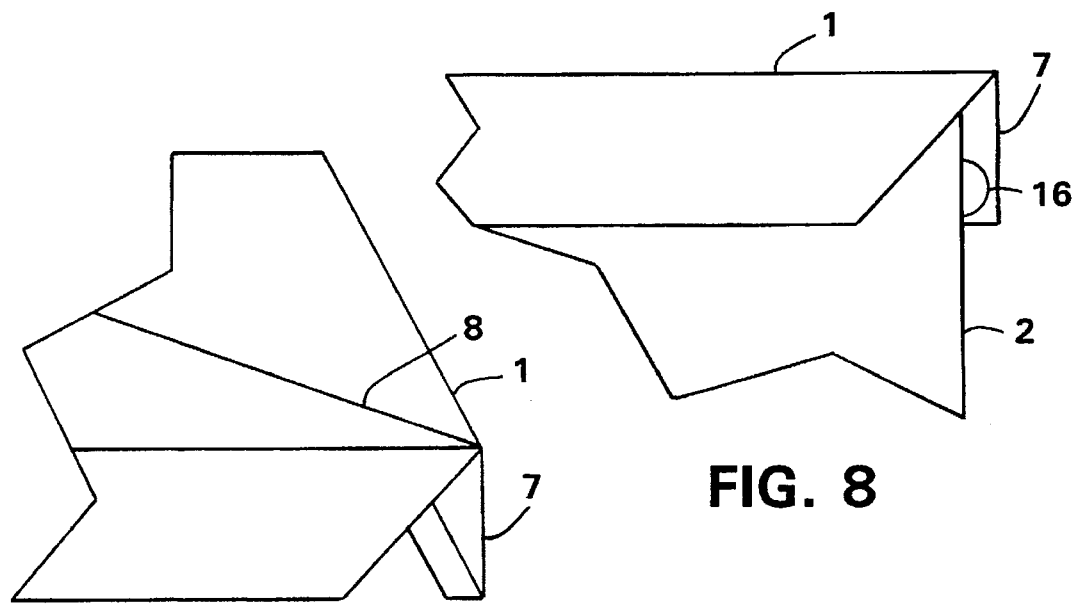
FIG. 8
FIG. 9

SMOKER-GRILL

BACKGROUND OF THE INVENTION

1. Field of Invention

This invention relates to portable food preparation and cooking devices. It particularly relates to portable smoking and cooking devices fueled by denatured alcohol and which combines a food smoking and barbecue grill in a single unit.

2. Description of the Prior Art

There are numerous ways to smoke or grill food using propane, charcoal, denatured alcohol fuel or electric power to heat wood chips or saw dust thus generating smoke. In the past, sheds and tents were used to contain the smoke in which food was prepared or preserved. Various self-contained food-smoking devices design to emulate "smoke houses" or tents are commercially available. They require relatively large fuel chambers and smoke chambers. These designs are generally too bulky to be considered portable.

Charcoal is a commonly used fuel in portable smokers. In using charcoal it is difficult to maintain a relatively constant temperature and refueling is awkward and generates unwanted gases when additional charcoal is added to the smoker. Denatured alcohol fuel, a clean burning fuel, makes recharging the smoker relatively simple. There are no undesirable fumes or smoke generated in its burning. There is a need for a compact, portable which incorporates the capability to cook or preserve food by smoking.

SUMMARY OF THE INVENTION

The present invention is a compact, portable smoker-grill using denatured alcohol for fuel. This Smoker-Grill generates heat and smoke though primary and secondary burning. The design directs the flow of heat and smoke so that it is evenly distributed throughout the cooking and smoking chamber that significantly decreases the time needed for food to be cooked. A tight-fitting top which prevents the heat from warping the cover and letting the smoke escape. Denatured alcohol is a clean burning fuel that does not leave smoke or ash residues. When the food is prepared, the denatured alcohol flame can be easily smothered and the fuel saved for future use. A centrally located drain in the divider unit allows drippings from the food product to drain through the hole and into the fire pot where it settles to the bottom of the container. After the denatured alcohol is completely burned out, the collected grease can easily be cleaned out.

BRIEF DESCRIPTION OF THE DRAWING

In drawings that show a preferred embodiment of the portable smoker-grill:

FIG. 7 is a perspective of the tight-fitting top.

FIG. 8 is an exploded, cutaway side view of the top and base unit showing closure.

FIG. 9 is an exploded view of the top corner flange detail.

DESCRIPTION OF THE REFERRED EMBODIMENT

Figure 1:
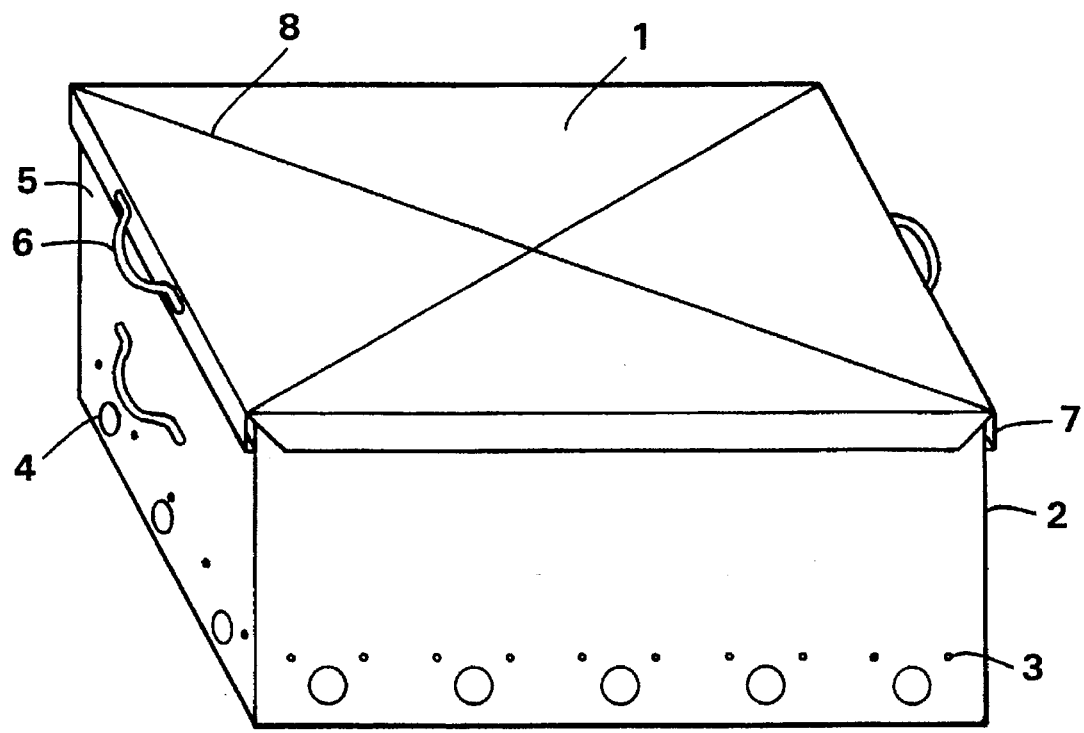
FIG. 1 is a perspective view of the base unit and tight-fitting top in a closed configuration.
Figure 2:
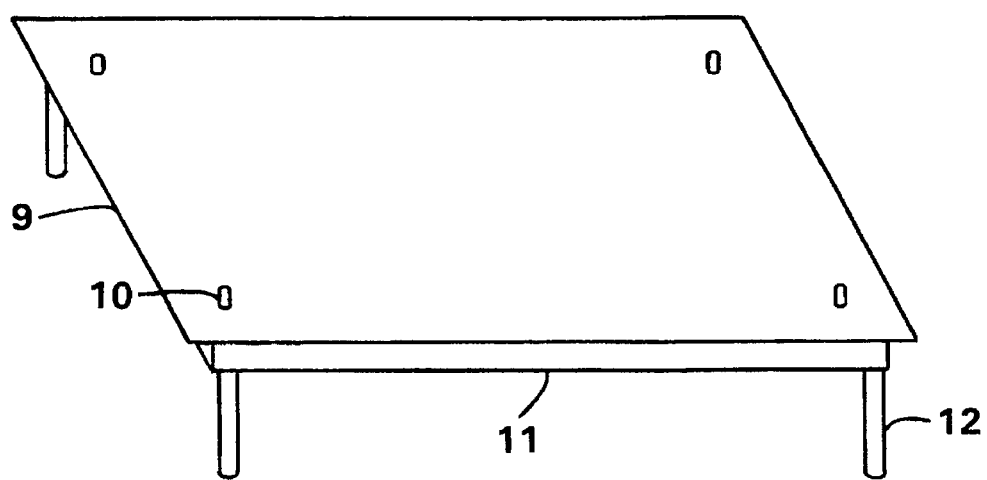
FIG. 2 is a perspective view of the smoker-grill stand assembly.
Figure 3:
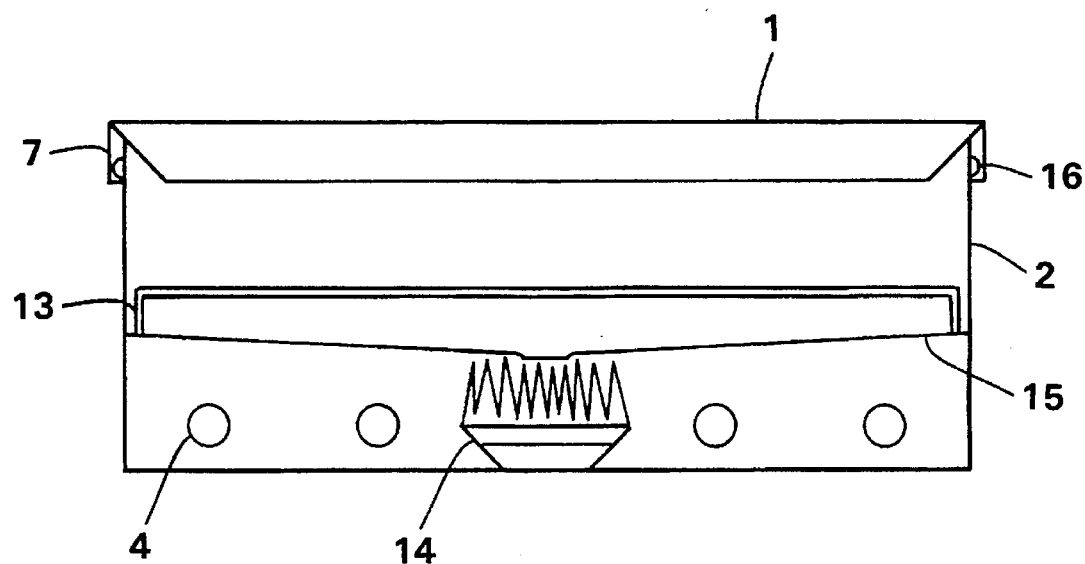
FIG. 3 is a cutaway from view of the assemble base unit, wire rack, and fire pot

Referencing FIGS. 1, 2, and 3, the smoker-grill of the invention has a top 1, a base unit 2, and a stand 9 which supports the base unit during use as a smoker or grill. The stand 9 fits inside the base unit 2 during transport or storage. The centering knobs 10 are set in from the edge of the stand assembly 9 at each corner center the base unit 2 on the stand and provide lateral stability to the unit in use. In use, the fire pot 14 is positioned at the center of and supported by the stand assembly 9. The support legs 12 provide for an air space between the fire pot 14 support surface and the surface on which the smoker-grill unit is place. The tight-fitting top has handles 5 positioned at its ends and diagonal bends 8 to add rigidity to the top. The top is held in place by the flange 7 that fits over four closure buttons 16 positioned at the outside ends of the base unit 2. The base unit is attached to the divider 15 using rivets 3. The air holes 4 around the bottom of the unit let oxygen into the burning chamber area that is between the divider 15 and stand assembly 9. A handle 6 at each end of the base unit 2 is used to carry the unit in a storage configuration and to position the base unit on the stand assembly 9.

Figure 4:
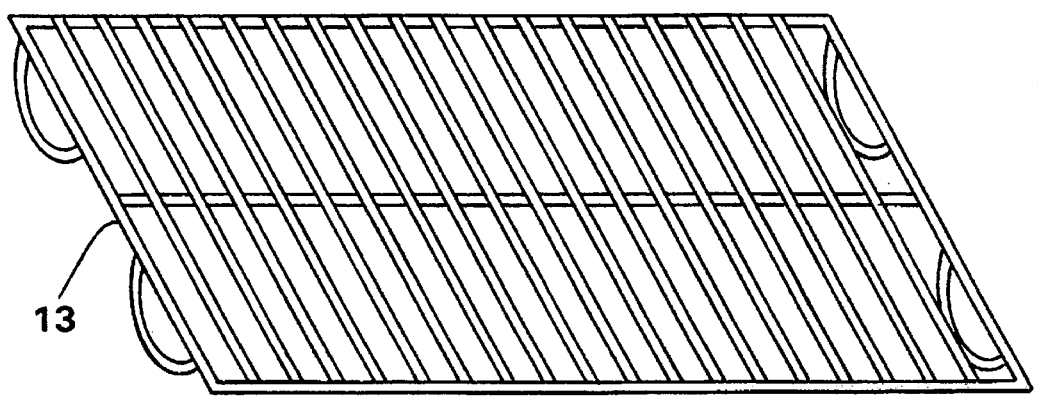
FIG. 4 is a perspective view of the wire rack.

FIGS. 3 and 4 also show the wire rack 13 used for smoking and grilling. The wire rack, constructed from chrome-plate steel wire, is positioned over the divider 15 when the smoker-grill unit is in use or being stored. The wire rack 13 is removable for cleaning. The fire pot 14 contains the denatured-alcohol fuel supply. Combustion occurs at the surface of the fire pot 14 fuel supply.

Figure 5:
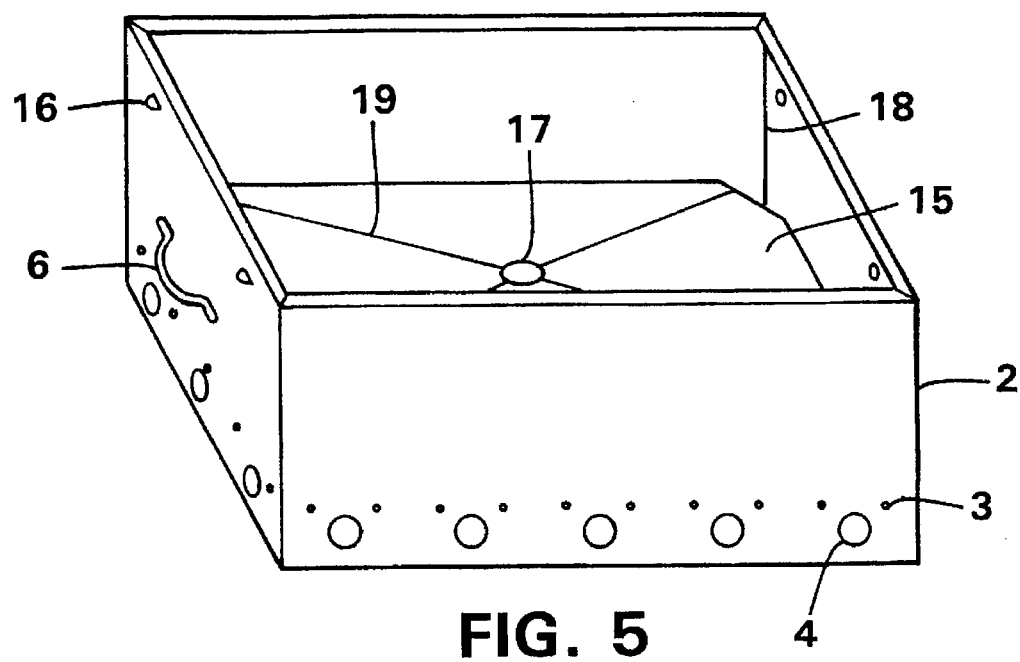
FIG. 5 is a perspective view of the base unit showing the divider, drain hole positions and triangular corner openings
Figure 6:
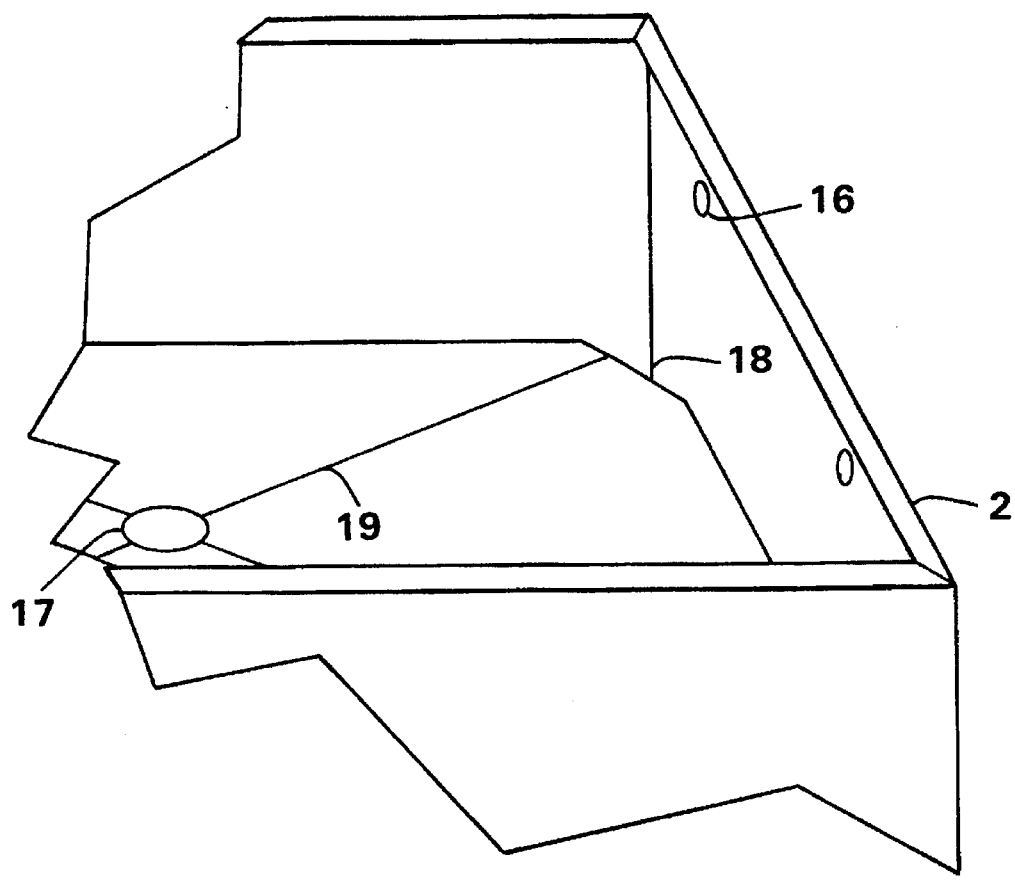
FIG. 6 is an exploded view of the base unit and divider configuration.

With reference to FIGS. 5 and 6 the divider 15 is permanently adjoined to the base unit immediately above the air holes 4 using rivets 3. Hardwood sawdust or shavings are placed directly on the divider 15 when the unit is being used for smoking. A drain hole 17 is located at the center of the divider 15. The stainless steel divider 15 is sloped 18 from its four outside edges to the drain hole 17. The drain hole 17 allows the drippings from your cooking or smoking product to migrate to and pass through the drain hole 17 into the fire pot 14 where it settles to the bottom of the fuel supply. The drain hole 17 in conjunction with the triangular corner openings 18 cut into each of the four divider 15 corners provides for circulation of smoke from the space above the divider 15 to the space below the divider 15. The smoke is re-burned in this process and heat is more evenly distributed throughout the base unit 2 providing higher temperatures equally distributed while cooking.

Referencing FIGS. 7, 8, and 9 The tight-fitting top 1 closure is effected by positioning the top 1 on the base unit 2 so that the top flange 7 engages the closure buttons 16. The tight-fitting mechanical closure maintains the heat and smoke density in base unit 2.

In operation, the stand assembly 9 is placed on an appropriate surface ant the fire pot 14 is placed at the center of the stand assembly 9 and filled with denatured alcohol. The denatured alcohol is ignited and the base unit 2 with the top 1 off is positioned over the four centering knobs 10 located at the four corners of the stand assembly 9. When used as a smoker, hardwood chips or sawdust is place on the divider 15 before the wire rack 13 is place in the base unit 2. The top 1 is used to cover the base unit after the product is placed on the wire rack 13. If the fuel supply needs replenishment the base unit 2 can be removed from the stand assembly 9 using the handles 6 at the ends of the base unit 2 and replaced after the fire pot 14 is refueled and ignited.

The invention has been described for the purpose of illustration. It is understood that the detail herein is solely for the purpose of illustration and that variations can be made therein by those skilled in the art without departing from the spirit and scope of the invention.

We claim:

1. A portable smoker-grill unit comprising:

a rectangular base unit having four sidewalls;

a top cover covering said base unit;

a stand assembly disposed below said base unit and supporting said base unit;

a stainless steel divider disposed within said base and riveted to said sidewalls of said base thereby defining a lower chamber and an upper chamber within said base;

said upper chamber further including a wire rack disposed within said upper chamber and supported by said divider for receiving food product to be smoked or grilled, said wire rack providing a space between said wire rack and said divider to hold wood products for smoking;

a fire pot having a denatured alcohol fuel supply disposed in said lower chamber; and a plurality of air inlet holes disposed through said sidewalls at said lower chamber in order to provide oxygen from outside the base unit to said fire pot within said lower chamber.

2. The portable smoker-grill unit according to claim 1 wherein:

said base unit includes closure buttons disposed upon said sidewalls for holding said top cover during use and storage;

said top cover further includes a top flange, said top flange being engagable with said closure buttons to form a tight fit of said cover to said base unit; and diagonal bends formed upon said top cover in order to provide additional rigidity at high operating temperatures.

3. The portable smoker-grill unit according to claim 1 wherein:

said divider includes sloped portions for draining grease material, said sloped portions extending from said sidewalls to a center drain hole through said divider; and said divider further having a triangular opening at each corner of said rectangular base to allow even heat distribution and smoke circulation between said upper and lower chambers.

4. The portable smoker-grill unit according to claim 3, wherein said fire pot is of the type of which the combustion occurs at the surface of the denatured alcohol fuel supply and said fire pot is disposed below said center drain hole such that fat and grease during smoking and cooking is collected for cleaning.

* * * * *